United States Patent
Joudareff et al.

(10) Patent No.: US 11,927,141 B2
(45) Date of Patent: Mar. 12, 2024

(54) METHOD FOR DETERMINING THE DENSITY OF FUEL FOR METERING FUEL IN A FUEL SUPPLY CIRCUIT OF AN AIRCRAFT ENGINE

(71) Applicant: Safran Aircraft Engines, Paris (FR)

(72) Inventors: Arnaud Bernard Clément Thomas Joudareff, Moissy-Cramayel (FR); Loïc Pora, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 313 days.

(21) Appl. No.: 17/620,481

(22) PCT Filed: Jul. 3, 2020

(86) PCT No.: PCT/EP2020/068906
§ 371 (c)(1),
(2) Date: Dec. 17, 2021

(87) PCT Pub. No.: WO2021/001563
PCT Pub. Date: Jan. 7, 2021

(65) Prior Publication Data
US 2022/0268217 A1    Aug. 25, 2022

(30) Foreign Application Priority Data

Jul. 3, 2019   (FR) ...................................... 1907427

(51) Int. Cl.
*F02C 9/26*         (2006.01)
*B64D 37/00*        (2006.01)
(Continued)

(52) U.S. Cl.
CPC .............. *F02C 9/26* (2013.01); *B64D 37/005* (2013.01); *F02C 7/232* (2013.01); *G01N 9/32* (2013.01)

(58) Field of Classification Search
CPC .......... F02C 9/26; F02C 7/232; B64D 37/005; G01N 9/32
(Continued)

(56) References Cited

U.S. PATENT DOCUMENTS

| 4,508,127 A | 4/1985 | Thurston |
| 5,908,463 A * | 6/1999 | Akazaki .............. F02D 41/1473 123/480 |

(Continued)

FOREIGN PATENT DOCUMENTS

| AU | 2023201884 A1 * | 10/2023 | ............. B64D 37/30 |
| CN | 101418743 B * | 5/2012 | ......... F02D 41/0072 |

(Continued)

OTHER PUBLICATIONS

Chinese Office Action and Search Report for Chinese Application No. 202080048700.1, dated Nov. 17, 2023, with an English translation.

*Primary Examiner* — Atul Trivedi
(74) *Attorney, Agent, or Firm* — Birch, Stewart, Kolasch & Birch, LLP (57) ABSTRACT

The invention relates to a method for metering fuel in a fuel supply circuit of an aircraft engine, the circuit comprising a metering device for a fuel circuit of an aircraft engine comprising, downstream of a fuel pumping system and upstream of injectors: —a fuel inlet (E), —a metering device (FMV) and a cut-off device (HPSOV) arranged in series, —an adjustment valve (VR) arranged on a fuel recirculation branch, such that any excess fuel supplied by the pumping system is fed back into the fuel circuit, wherein at least one flow-metric sensor (WFM1) is arranged on the recirculation branch, a density value for the metered fuel is determined (Continued)

according to the sensor measurements and the metering device is controlled according to the fuel density value thus determined.

8 Claims, 5 Drawing Sheets

(51) Int. Cl.
    *F02C 7/232* (2006.01)
    *G01N 9/32* (2006.01)
(58) Field of Classification Search
    USPC .......................................................... 701/100
    See application file for complete search history.

(56) References Cited

U.S. PATENT DOCUMENTS

| | | | | |
|---|---|---|---|---|
| 6,253,748 | B1* | 7/2001 | Engel | F02D 41/2416 |
| | | | | 123/568.21 |
| 6,959,536 | B1* | 11/2005 | Maher | F02C 9/266 |
| | | | | 417/540 |
| 8,166,762 | B2* | 5/2012 | Scully | F02C 7/232 |
| | | | | 60/734 |
| 8,205,597 | B2* | 6/2012 | Brocard | F02C 7/22 |
| | | | | 123/457 |
| 10,330,023 | B2* | 6/2019 | Selstad | G01F 13/00 |
| 2008/0283663 | A1* | 11/2008 | Space | B64D 13/06 |
| | | | | 244/118.5 |
| 2015/0027412 | A1* | 1/2015 | Henson | F02M 45/12 |
| | | | | 123/457 |
| 2017/0283083 | A1* | 10/2017 | Behbahani-Pour | A62C 3/08 |
| 2021/0087980 | A1 | 3/2021 | Pora et al. | |
| 2022/0010729 | A1* | 1/2022 | Foiret | F02C 9/263 |
| 2022/0178306 | A1* | 6/2022 | Durand | F02C 7/22 |
| 2022/0178544 | A1* | 6/2022 | Durand | F02C 9/40 |
| 2022/0268217 | A1* | 8/2022 | Joudareff | F02C 7/232 |
| 2023/0167949 | A1* | 6/2023 | Jouan | F02C 3/22 |
| | | | | 62/50.2 |
| 2023/0202669 | A1* | 6/2023 | Hauzeray | B64D 37/005 |
| | | | | 701/31.9 |
| 2023/0332543 | A1* | 10/2023 | Bemment | F02C 7/224 |

FOREIGN PATENT DOCUMENTS

| | | | | | |
|---|---|---|---|---|---|
| CN | 107806370 | A | * | 3/2018 | ........... F02D 41/064 |
| CN | 115702286 | A | * | 2/2023 | ........... B64D 37/005 |
| EP | 0695864 | A2 | * | 2/1996 | |
| EP | 0719919 | A2 | * | 7/1996 | |
| EP | 0719922 | A2 | * | 7/1996 | |
| EP | 0719923 | A2 | * | 7/1996 | |
| EP | 0719925 | A2 | * | 7/1996 | |
| EP | 0719926 | A2 | * | 7/1996 | |
| EP | 0719927 | A2 | * | 7/1996 | |
| EP | 0719929 | A2 | * | 7/1996 | |
| EP | 0719930 | A2 | * | 7/1996 | |
| EP | 2105602 | A2 | * | 9/2009 | ........... F02M 47/027 |
| EP | 4060173 | A1 | * | 9/2022 | ............. F01K 23/10 |
| FR | 2935749 | A1 | * | 3/2010 | .............. F01D 17/26 |
| FR | 3 053 396 | A1 | | 1/2018 | |
| FR | 3053396 | A1 | * | 1/2018 | .............. F02C 7/232 |
| FR | 3 069 021 | A1 | | 1/2019 | |
| FR | 3095840 | A1 | * | 11/2020 | .............. F02C 7/232 |
| FR | 3103269 | A1 | * | 5/2021 | ............... G01F 1/86 |
| FR | 3103270 | A1 | * | 5/2021 | ............... G01F 1/86 |
| JP | 2002004951 | A | * | 1/2002 | |
| JP | 2004251627 | A | * | 9/2004 | ......... G01N 33/0037 |
| WO | WO-2015015129 | A2 | * | 2/2015 | ........... B64D 37/00 |
| WO | WO-2021001563 | A1 | * | 1/2021 | ........... B64D 37/005 |
| WO | WO-2021240106 | A1 | * | 12/2021 | ............. B64D 37/04 |

* cited by examiner

METHOD FOR DETERMINING THE DENSITY OF FUEL FOR METERING FUEL IN A FUEL SUPPLY CIRCUIT OF AN AIRCRAFT ENGINE

The invention generally relates to the supply of fuel to aircraft engines, and particularly to turbomachines.

It relates to a method for metering fuel as well as to a circuit for supplying fuel to an aircraft engine.

GENERAL TECHNICAL FIELD AND PRIOR ART

Plane engines are conventionally equipped with a specific fuel metering system called FMU (Fuel Metering Unit) or HMU (Hydro Mechanical Unit).

This metering system fulfills several functions. It is used to regulate the flow rate of fuel delivered to the combustion chamber, as well as to cut off the flow rate of fuel delivered to the combustion chamber (engine shutdown), in particular in case of overspeed (engine speed exceeding the authorized speed). It further ensures the pressurization of the engine fuel system.

Conventionally, a mass flowmeter is interposed between this metering system FMU and the device for injecting fuel into the combustion chamber.

The information it provides is sent to the control computer EEC of the engine, but it is in no way used in the engine regulation loops: it is transmitted by the EEC to the plane computer for a cockpit display.

The metered flow rate information used in controlling the metering device FMU is for its part generally obtained independently of this flow rate measurement provided by the engine flowmeter.

The metered flow rate is indeed usually reconstituted according to the position of the metering actuator, thanks to a position sensor of the LVDT (Linear Variable Displacement Transducer) type.

However, the metered flow rate values thus calculated are relatively inaccurate.

The most important inaccuracies are related to the variability of the type of fuel used for the combustion, as well as the possible operating temperature range for the fuels.

Figure 1:
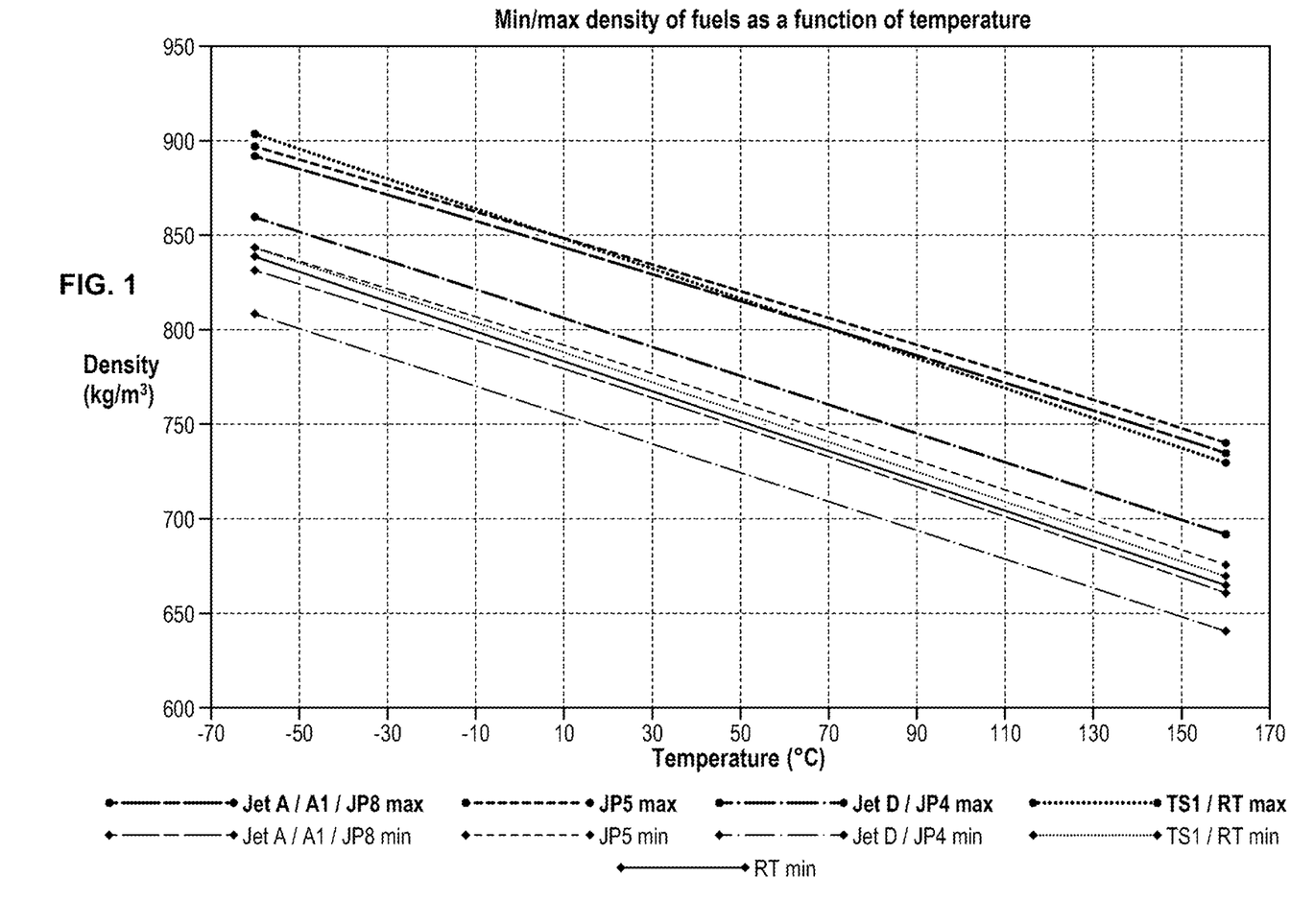
FIG. 1 is a graph on which the curves of the densities of these fuels as a function of temperature are plotted for different fuels.

This is illustrated in FIG. 1 on which different values of fuel density for different types of fuel have been represented as a function of temperature.

As can be seen in this figure, at low temperature, the density fluctuation from one fuel to another can be by nearly 12.5 percent; it can be by nearly 15 percent at high temperature.

However, it is unusual to find only one type of fuel in all of the tanks of a plane. The different airports or maintenance operation centers are not required to fill the tanks with the same fuel as the previous introduced one.

In order to avoid engine operability problems linked to an overmetering or an undermetering of fuel, in particular in starting or deceleration phase, and more generally avoid any risk of non-ignition, flame-out or locking, the engines are designed and certified to receive several types of fuel to be consumed in combustion, and this over the entire temperature range that the fuels may encounter. The same applies to the fuel circuits as well as the inherent pieces of equipment which are also designed to be functional for the various possible fuels. They are adapted to the intrinsic properties (density, lubrication power, LHV) thereof.

Thus, the strong inaccuracies in the metered flow rates that the variations in the types of fuel and temperature can generate now require an oversizing of the engines and their pieces of equipment.

French patent applications referenced FR3053396A1 and FR3069021A1 are also known.

GENERAL PRESENTATION OF THE INVENTION

A general aim of the invention is to propose a regulation of the fuel flow rate with greater metering accuracy.

Another aim of the invention is to allow optimized sizing of the engine and of the supply circuit and a mass gain on both of them.

Another aim of the invention is to allow sizing the metering actuator and the elements of the engine independently of the nature and temperature of the fuel.

An improvement in the metering accuracy is reflected in a better sizing of the engine and for example particularly of its air compression module.

A more optimized compressor is more efficient and improves the specific fuel consumption of the engine.

This further decreases the amount of fuel to be loaded for a similar maneuver.

Also the resulting mass gain results in a reduction of the power to be delivered by the engines in order to ensure the thrust for the aircraft.

Apart from the reduced engine size, the fuel consumption will be lower.

An improvement in the metering accuracy further allows a reduction of the amount of fuel recirculated into the fuel circuit, limited by the need for cooling the engine oil.

Also, the fact that less fuel is recirculated leads to a simplification of the fuel system and therefore to a mass gain.

Thus, according to one aspect, the invention proposes a method for metering fuel in a fuel supply circuit of an aircraft engine, said circuit including a metering device for an aircraft engine fuel circuit including, downstream of a fuel pumping system and upstream of injectors:
- a fuel inlet,
- a metering member and a cut-off member disposed in series,
- a regulating valve disposed on a fuel recirculation branch, so that fuel provided in excess by the pumping system is discharged into the fuel circuit.

At least one flow-metric sensor is disposed on the recirculation branch and a value of the density of the metered fuel is determined based on the measurements of said sensor and the metering member is controlled based on the fuel density value thus determined.

In particular, a mass flow rate and a volume flow rate are determined based on the signals measured by the flow-metric sensor, the value of the metered fuel density being determined as equal to the ratio between the mass flow rate and the volume flow rate thus determined.

A metered flow rate can be calculated by subtracting the recirculated flow rate from the pumped flow rate seen by the flow-metric sensor on the recirculation branch.

As a variant, at least one flow-metric sensor is disposed downstream of the metering device and another value of the density of the metered fuel is determined based on the measurements of this sensor and the metering member is controlled based on this fuel density value, as well as the fuel density value determined based on the measurements of the sensor disposed on the recirculation branch.

The invention further relates to a fuel supply circuit of an aircraft engine.

It relates to an aircraft engine, in particular a turbomachine, including such a circuit and a plane including such an engine.

BRIEF DESCRIPTION OF THE DRAWINGS

Other characteristics and advantages of the invention will emerge from the following description, which is purely illustrative and not restrictive, and should be read in relation to the appended figures in which.

DESCRIPTION OF ONE OR SEVERAL MODES OF IMPLEMENTATION AND EMBODIMENTS

Reminders on the Fuel Supply Circuits

Figure 2:
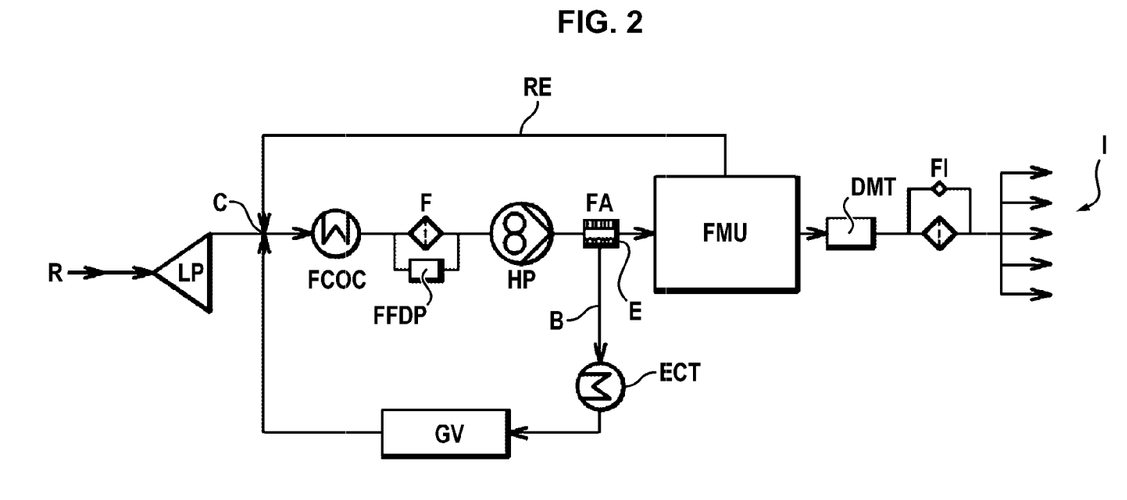
FIG. 2 is a schematic representation of an example of an already known general architecture of a fuel supply circuit of the combustion chamber of a plane engine.

The supply circuit represented in FIG. 2 corresponds to a conventionally known general architecture. It includes in series, in the direction of circulation of the fuel: a low-pressure pump LP, a main heat exchanger FCOC or "Fuel Oil Exchanger" using the fuel as a cold source, a fuel filter F, a high-pressure HP pump, and the fuel metering unit FMU.

The high-pressure HP pump is for example a gear pump whose fixed displacement is optimized on the engine speed of the turbomachine on take-off.

In addition to supplying the combustion chamber, the high-pressure HP pump also supplies fuel to the "variable geometries" GV of the engine, which are pieces of equipment or turbomachine members comprising movable elements, requiring taking variable hydraulic power to operate.

These pieces of equipment or members GV can be of various types, for example a cylinder, a servovalve, an adjustable compressor relief valve, a compressor transient relief valve and/or an air flow rate adjustment valve for a clearance adjustment system at the top of rotor blades for a low-pressure turbine or a high-pressure turbine.

To this end, fuel is derived from the fuel supply circuit, on a branch B for supplying the "variable geometries", which extends between a node E located between the HP pump and the metering unit FMU and a node C located between the low-pressure LP pump and the high-pressure HP positive displacement pump.

At the node E, the illustrated supply circuit includes a self-cleaning filter FA for filtering the derived fuel flow rate fraction. This filter FA is washed by the fuel flow circulating in the supply circuit towards the fuel metering unit FMU. The branch B can further comprise, upstream of the pieces of equipment GV, a heat exchanger ECT for the temperature control of the derived fuel.

The supply circuit of the combustion chamber also includes a recovery circuit RE, also called fuel recirculation branch, connecting the fuel metering unit FMU to the supply circuit, between the low-pressure pump LP and the heat exchanger FCOC (node C for example). The excess fuel flow rate provided to the fuel metering unit FMU can thus be returned, through this recovery circuit RE, upstream of the heat exchanger FCOC, to the main fuel filter F and the high-pressure HP pump.

Thus, in operation, the fuel coming from a tank R is sucked by the low-pressure LP pump and pumped into the supply circuit. In this supply circuit, it is first cooled at the main heat exchanger FCOC, and then filtered in the fuel filter F. Downstream of this filter F, it is sucked by the high-pressure HP pump, and pumped, under high pressure, towards the connection (node E), in which a fraction of the fuel flow rate is diverted from the supply circuit to the pieces of equipment GV and passes through the self-cleaning filter FA.

The remainder of the fuel flow rate passes through the self-cleaning filter FA, towards the fuel metering unit FMU, by cleaning said filter FA. The unit FMU for its part ensures in particular the metering of the fuel flow rate provided to the combustion chamber through the injectors I, for example via a flowmeter DMT connected to the control computer EEC and injection filters FI disposed upstream of the injectors I.

Architecture of an FMU System

Figure 3:
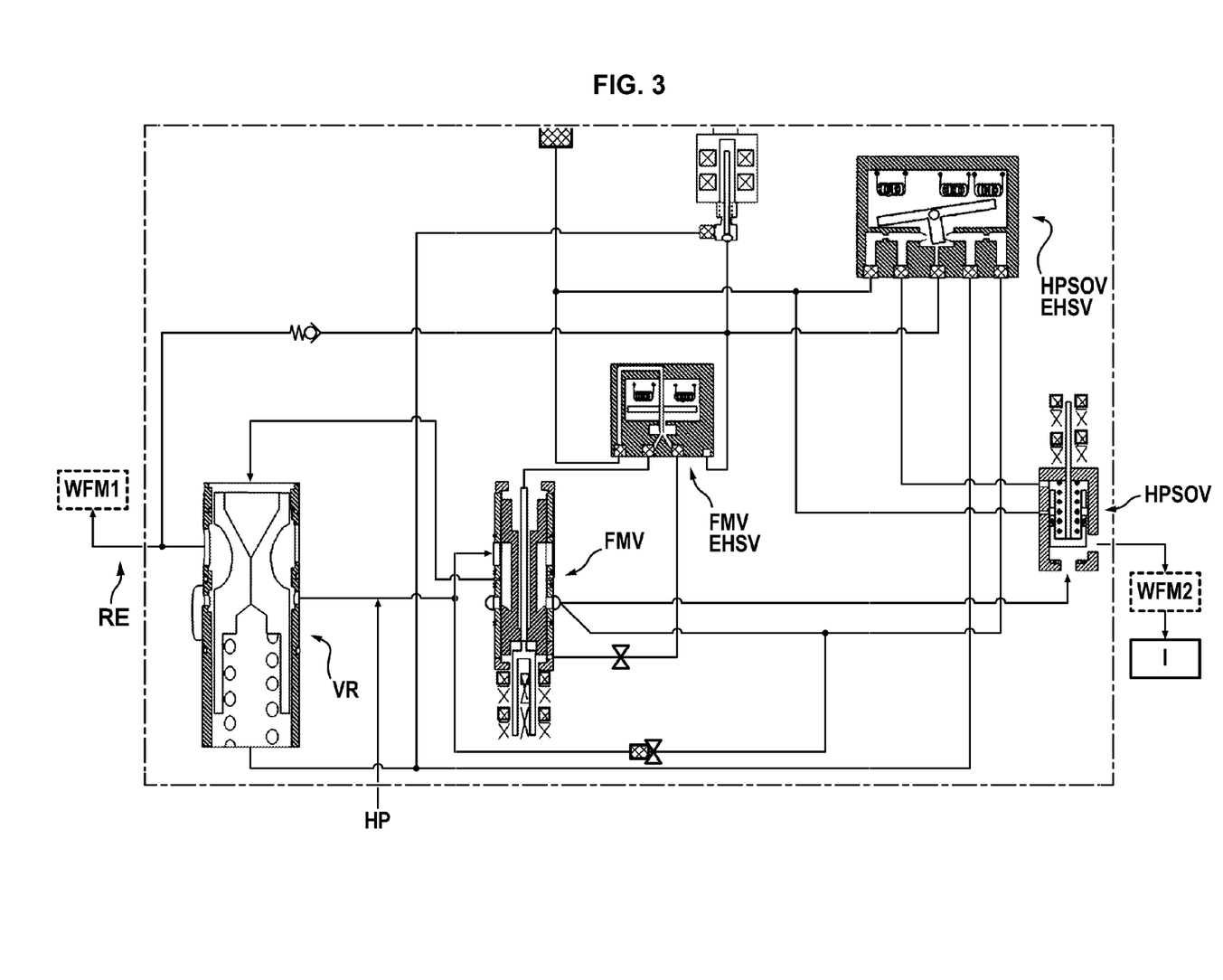
FIG. 3 is a schematic representation of a metering system FMU associated with a sensor for the implementation of the invention.

The metering system FMU illustrated in FIG. 3 is placed in a fuel supply circuit of an engine, downstream of a fuel pumping system (HP pump) and upstream of the injectors I it supplies.

A regulating valve VR is located at the inlet of the metering system, on the branch which ensures the fuel recirculation discharge.

This regulating valve VR ensures a constant pressure differential across the FMU.

This regulating valve VR conventionally called "by-pass valve" is a purely passive member which, thanks to a back pressure of a spring allows maintaining a certain pressure differential between the inlet of the FMU and the outlet of the SOV.

The spring in the valve (example below) acts against a piston (spool) on either side of which fuel is at different pressures.

The metering of the flow rate is for its part made by means of a metering member generally called FMV (Fuel Metering Valve). This member is controlled by the control computer EEC through a servovalve, which evaluates the metered mass flow rate Q by the following formula for calculating the flow rate passing through an orifice:

$$Q = K_S * S\sqrt{\rho * \Delta P}$$

where $\Delta P$ is the pressure differential, S is the surface of the orifice allowing the passage of the fuel fluid through the FMV, $\rho$ is the density of said fluid and $K_s$ is a parameter related to the FMV.

Said metering member FMV conventionally includes a movable spool, associated with a linear position sensor LVDT (Linear Variable Differential Transducer)—case illustrated in FIG. 2—or rotary sensor RVDT (Rotary Variable Differential Transducer).

The position of the spool as measured by the LVDT or RVDT sensor is transmitted to the control computer EEC which controls the displacement of the spool via a servovalve (FMV EHSV in FIG. 2): the metered flow rate is a function of the position of the movable spool, since the pressure differential is kept constant.

As output, the FMU includes an HPSOV valve (High pressure Shut-Off Valve) which on the one hand allows pressurizing the fuel circuit and on the other hand allows cutting off the injection flow rate (for example in case of detection of an overspeed of the engine).

Like the metering member, the HPSOV shut-off valve comprises a position sensor LVDT or RVDT sending position information to the engine control computer EEC. The displacement of said HPSOV valve is controlled by the computer via an HPSOV EHSV servovalve.

Improvement of the Metering Accuracy

The metering system FMU is further supplemented by a flowmeter sensor WFM1 disposed upstream of the regulating valve VR, on the recirculation loop RE.

This flowmeter WFM1 allows both measurement of the mass flow rate and measurement of the volume flow rate.

These two pieces of information are processed by the EEC to determine the fuel density by simple division of the measured mass flow rate by the volume flow rate also measured.

The mass flow rate sensor WFM1 is for example a sensor with two rotors of the type of those described in U.S. Pat. No. 3,144,769 or a drum and impeller sensor as described in patent EP 0.707.199 (Crane technology—https://www.craneae.com/Products/Fluid/FlowmeterWorks.aspx).

Figure 4:
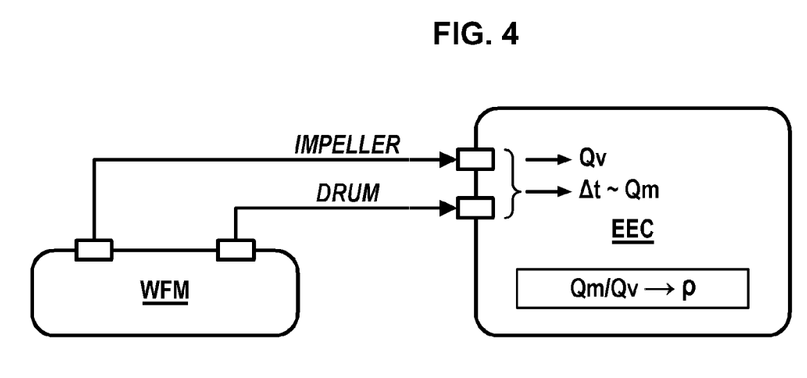
FIG. 4 illustrates a general principle for an implementation of the invention.

As illustrated in FIG. 4 in the case where the sensor WFM1 comprises a drum output (DRUM) and an impeller output (IMPELLER), the speed of rotation of the drum and of the impeller is proportional to the volume flow rate Qv, while the time offset $\Delta T$ between the drum and the impeller is proportional to the mass flow rate Qm.

Figure 5:
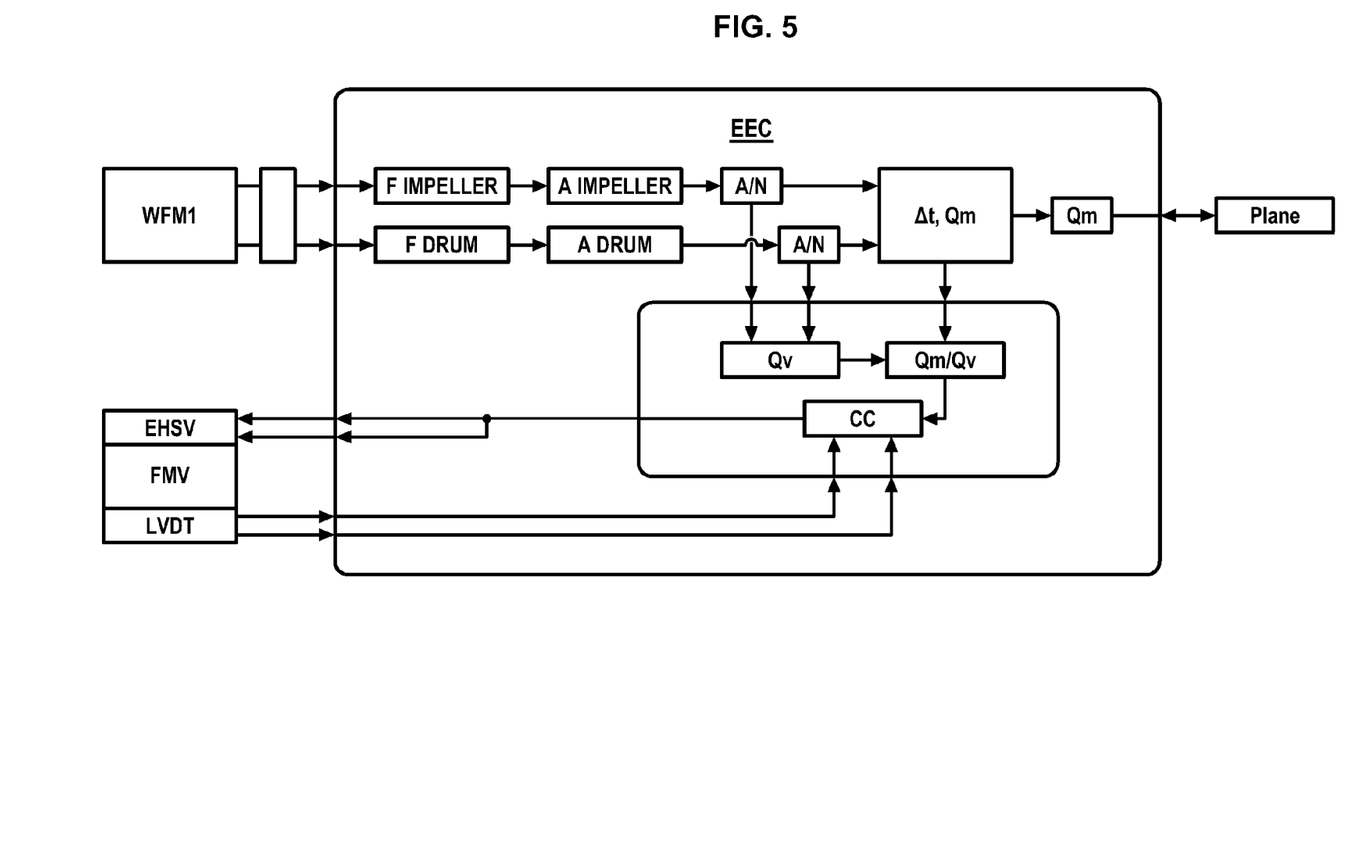
FIG. 5 illustrates an implementation of the invention by an engine control computer.

As illustrated in FIG. 5, the computer EEC receives from the sensor WFM the signals from the solenoids thereof which follow the rotation of the drum (DRUM) and the rotation of the impeller (IMPELLER).

After filtering (F IMPELLER; F DRUM) and amplification (A IMPELLER; A DRUM), these signals are digitized (A/D). The EEC consolidates the signals of the drum (DRUM) and of the impeller (IMPELLER) to deduce therefrom the volume flow rate Qv, which passes through the sensor WFM. It compares the signals of the drum (DRUM) and of the impeller (IMPELLER) to deduce therefrom the time offset $\Delta T$ of rotation between them, and the mass flow rate Qm (which is sent to the computer of the plane.

It then calculates the ratio Qm/Qv which corresponds to the fuel density.

Based on the fuel density thus determined, as well as on the opening S of the metering member provided thereto by the sensor LVDT, the computer EEC calculates the flow rate Q metered by the metering member using the formula:

$$Q = K_S * S\sqrt{\rho * \Delta p}$$

already indicated above.

The computer EEC then determines a control current DC for the FMV EHSV servovalve, in order to regulate the displacement of the spool of the metering device FMV so that it matches the metering to be controlled.

In this way, the fuel metering control is made with greater accuracy than in the case of a metered flow rate as conventionally reconstituted.

In one advantageous mode of implementation, the mass flow rate sensor is also used downstream of the FMU to access a second flow rate value. This second value ensures a redundancy.

It should be noted that such a solution allows sustained flow rate throughout the flight without exploring very low flow rates and without fast transient.

Particularly, the calculated density is not disturbed by the changes in the engine speed and the pressure deviations.

Such an improvement in the metering accuracy allows better sizing of the engine air compression module. As the compressor is more optimized, the fuel consumption of the engine is improved. This results in a reduction in the amount of fuel to be loaded, as well as a mass gain for the aircraft which results in a reduction of the power to be delivered in order to ensure the thrust of the aircraft.

In addition, since the size of the engine is reduced, the fuel consumption is lower. Better metering further allows a reduction of the amount of recirculated fuel, which leads to a simplification of the fuel system, and here again, a mass gain for the engine.

Also, the more accurate knowledge of the density of the fuel allows greatly simplifying the design of the temperature compensation in the hydraulic block. In the supply circuit of FIG. 2, the heat exchanger FCOC and the exchanger ECT can be sized less than in the case of the prior solutions.

In one advantageous mode of implementation, the mass flow rate sensor downstream of the FMU is also used to access a second flow rate density value. This sensor (WFM2 in FIG. 2) is also of Crane technology or the like. The second density value it achieves ensures redundancy.

As a further variant, if the flow rate pumped by the pumping system downstream of the FMU is known to the computer EEC, the metered flow rate to be transmitted to the computer can be calculated by subtracting the recirculated flow rate seen by the sensor WFM1 from said pumped flow rate. The downstream sensor WFM2 can then be deleted.

The invention claimed is:

1. A method for metering fuel in a fuel supply circuit of an aircraft engine,
   the method comprising:
   metering fuel in an aircraft engine fuel circuit downstream of a fuel pumping system and upstream of injectors, the metering being performed by a metering member disposed in series with a cut-off member;
   discharging into a recirculation branch of the fuel circuit fuel provided in excess by the pumping system, the discharging being performed by a regulating valve;
   determining a value of a density of the metered fuel based on measurements made by at least one flow-metric sensor on the recirculation branch; and
   controlling the metering member based on the density value.

2. The fuel metering method according to claim 1, comprising determining a mass flow rate and a volume flow rate based on signals measured by the flow-metric sensor,
   the density value being determined as equal to a ratio between the mass flow rate and the volume flow rate.

3. The fuel metering method according to claim 1, comprising calculating a metered flow rate by subtracting a recirculated flow rate from a pumped flow rate seen by the flow-metric sensor on the recirculation branch.

4. The fuel metering method according to claim 1,
   the method comprising:
   determining another value of the density of the metered fuel based on measurements of at least one downstream flow-metric sensor disposed downstream of the metering device; and
   controlling the metering member based on the other density value and on the fuel density value determined based on the measurements of the sensor disposed on the recirculation branch.

5. A fuel supply circuit for an aircraft engine,
the circuit including a metering device including downstream of a fuel pumping system and upstream of injectors:
 a fuel inlet,
 a metering member and a cut-off member disposed in series,
 a regulating valve disposed on a fuel recirculation branch, and
 a computer configured for controlling the metering member and the regulating valve,
wherein at least one flow-metric sensor is disposed on the recirculation branch,
the computer being configured to implement a method comprising:
 metering fuel by the metering member;
 discharging into the recirculation branch fuel provided in excess by the pumping system, the discharging being performed by the regulating valve;
 determining a value of a density of the metered fuel based on measurements made by the flow-metric sensor; and
 controlling the metering member based on the density value.

6. A supply circuit according to claim 5, wherein at least one downstream flow-metric sensor is disposed downstream of the metering device,
 the computer being configured to implement the method comprising:
  determining another value of the density of the metered fuel based on measurements of the downstream flow-metric sensor; and
  controlling the metering member based on the other density value and on the fuel density value determined based on the measurements of the sensor disposed on the recirculation branch.

7. An aircraft engine, in particular a turbomachine, including a supply circuit according to claim 5.

8. An aircraft including an aircraft engine according to claim 7.

* * * * *